US007015674B2

(12) United States Patent
VonderHaar

(10) Patent No.: US 7,015,674 B2
(45) Date of Patent: Mar. 21, 2006

(54) BOOSTER PACK WITH STORAGE CAPACITOR

(75) Inventor: J. David VonderHaar, Bolingbrook, IL (US)

(73) Assignee: Midtronics, Inc., Willowbrook, IL (US)

(*) Notice: Subject to any disclaimer, the term of this patent is extended or adjusted under 35 U.S.C. 154(b) by 239 days.

(21) Appl. No.: 10/112,114

(22) Filed: Mar. 28, 2002

(65) Prior Publication Data

US 2003/0184258 A1 Oct. 2, 2003

Related U.S. Application Data

(60) Provisional application No. 60/300,386, filed on Jun. 22, 2001.

(51) Int. Cl.
*H02J 7/00* (2006.01)

(52) U.S. Cl. ........................ 320/103; 320/104; 307/125

(58) Field of Classification Search ................. 320/103, 320/104, 116, 107, 101, 137, 139, 166, 105, 320/167; 307/125, 66, 45, 46, 72; 323/222, 323/271; 318/139, 150; 429/170, 500
See application file for complete search history.

(56) References Cited

U.S. PATENT DOCUMENTS 2,514,745 A 7/1950 Dalzell ........................ 171/95
3,356,936 A 12/1967 Smith ........................ 324/29.5
3,562,634 A 2/1971 Latner ............................. 31/4

(Continued)

FOREIGN PATENT DOCUMENTS

DE 29 26 716 B1 1/1981
EP 0 022 450 A1 1/1981
EP 0 637 754 A1 2/1995

(Continued)

OTHER PUBLICATIONS

Simple DC–DC Converter Allows Use of Single Battery, Electronix Express 10, Nov. 1998.*

"Electrochemical Impedance Spectroscopy in Battery Development and Testing", *Batteries International*, Apr. 1997, pp. 59 and 62–63.

"Battery Impedance", by E. Willihnganz et al., *Electrical Engineering*, Sep. 1959, pp. 922–925.

"Determining The End of Battery Life", by S. DeBardelaben, *IEEE*, 1986, pp. 365–368.

"A Look at the Impedance of a Cell", by S. Debardelaben, *IEEE*, 1988, pp. 394–397.

"The Impedance of Electrical Storage Cells", by N. A. Hampson et al., *Journal of Applied Electrochemistry*, 1980, pp. 3–11. No Date.

"A Package for Impedance/Admittance Data Analysis", by B. Boukamp, *Solid State Ionics*, 1986, pp. 136–140.

"Precision of Impedance Spectroscopy Estimates of Bulk, Reaction Rate, and Diffusion Parameters", by J. Macdonald et al., *J. Electroanal, Chem.*, 1991, pp. 1–11.

IEEE Recommended Practice for Maintenance, Testings, and Replacement of Large Lead Storage Batteries for Generating Stations and Substations, *The Institute of Electrical and Electronics Engineers, Inc., ANSI/IEEE Std.* 450–1987, Mar. 9, 1987, pp. 7–15.

(Continued)

*Primary Examiner*—Rajnikant B. Patel
(74) *Attorney, Agent, or Firm*—Westman, Champlin & Kelly

(57) ABSTRACT

A jump-start booster pack for starting a vehicle having a depleted vehicle battery is provided. The jump-start booster pack includes a positive connector that can couple to a positive terminal of the vehicle battery and a negative connector that can couple to a negative terminal of the vehicle battery. The apparatus also includes a storage capacitor that provides starting energy to the vehicle when electrical connection is made between the storage capacitor and the vehicle battery through the positive and negative connectors.

30 Claims, 5 Drawing Sheets

U.S. PATENT DOCUMENTS

| | | | | | |
|---|---|---|---|---|---|
| 3,593,099 | A | | 7/1971 | Scholl | 320/13 |
| 3,607,673 | A | | 9/1971 | Seyl | 204/1 |
| 3,676,770 | A | | 7/1972 | Sharaf et al. | 324/29.5 |
| 3,729,989 | A | | 5/1973 | Little | 73/133 |
| 3,753,094 | A | | 8/1973 | Furuishi et al. | 324/29.5 |
| 3,808,522 | A | | 4/1974 | Sharaf | 324/29.5 |
| 3,811,089 | A | | 5/1974 | Strezelewicz | 324/170 |
| 3,873,911 | A | | 3/1975 | Champlin | 324/29.5 |
| 3,876,931 | A | | 4/1975 | Godshalk | 324/29.5 |
| 3,886,443 | A | | 5/1975 | Miyakawa et al. | 324/29.5 |
| 3,889,248 | A | | 6/1975 | Ritter | 340/249 |
| 3,906,329 | A | | 9/1975 | Bader | 320/44 |
| 3,909,708 | A | | 9/1975 | Champlin | 324/29.5 |
| 3,936,744 | A | | 2/1976 | Perlmutter | 324/158 |
| 3,946,299 | A | | 3/1976 | Christianson et al. | 320/43 |
| 3,947,757 | A | | 3/1976 | Grube et al. | 324/28 |
| 3,969,667 | A | | 7/1976 | McWilliams | 324/29.5 |
| 3,979,664 | A | | 9/1976 | Harris | 324/17 |
| 3,984,762 | A | | 10/1976 | Dowgiallo, Jr. | 324/29.5 |
| 3,984,768 | A | | 10/1976 | Staples | 324/62 |
| 3,989,544 | A | | 11/1976 | Santo | 429/65 |
| 4,008,619 | A | | 2/1977 | Alcaide et al. | 73/398 |
| 4,024,953 | A | | 5/1977 | Nailor, III | 206/344 |
| 4,047,091 | A | | 9/1977 | Hutchines et al. | 363/59 |
| 4,053,824 | A | | 10/1977 | Dupuis et al. | 324/29.5 |
| 4,056,764 | A | * | 11/1977 | Endo et al. | 320/101 |
| 4,070,624 | A | | 1/1978 | Taylor | 327/158 |
| 4,086,531 | A | | 4/1978 | Bernier | 324/158 |
| 4,112,351 | A | | 9/1978 | Back et al. | 324/16 |
| 4,114,083 | A | | 9/1978 | Benham et al. | 320/39 |
| 4,126,874 | A | | 11/1978 | Suzuki et al. | 354/60 |
| 4,178,546 | A | | 12/1979 | Hulls et al. | 324/158 |
| 4,193,025 | A | | 3/1980 | Frailing et al. | 324/427 |
| 4,207,611 | A | | 6/1980 | Gordon | 364/580 |
| 4,217,645 | A | | 8/1980 | Barry et al. | 364/483 |
| 4,297,639 | A | | 10/1981 | Branham | 324/429 |
| 4,315,204 | A | | 2/1982 | Sievers et al. | 322/28 |
| 4,316,185 | A | | 2/1982 | Watrous et al. | 340/636 |
| 4,322,685 | A | | 3/1982 | Frailing et al. | 324/429 |
| 4,351,405 | A | | 9/1982 | Fields et al. | 180/65 |
| 4,361,809 | A | | 11/1982 | Bil et al. | 324/426 |
| 4,363,407 | A | | 12/1982 | Barckler et al. | 209/3.3 |
| 4,369,407 | A | | 1/1983 | Korbell | 324/416 |
| 4,379,989 | A | | 4/1983 | Kurz et al. | 320/26 |
| 4,379,990 | A | | 4/1983 | Sievers et al. | 322/99 |
| 4,385,269 | A | | 5/1983 | Aspinwall et al. | 320/14 |
| 4,390,828 | A | | 6/1983 | Converse et al. | 320/32 |
| 4,392,101 | A | | 7/1983 | Saar et al. | 320/20 |
| 4,396,880 | A | | 8/1983 | Windebank | 320/21 |
| 4,408,157 | A | | 10/1983 | Beaubien | 324/62 |
| 4,412,169 | A | | 10/1983 | Dell'Orto | 320/64 |
| 4,423,378 | A | | 12/1983 | Marino et al. | 324/427 |
| 4,423,379 | A | | 12/1983 | Jacobs et al. | 324/429 |
| 4,424,491 | A | | 1/1984 | Bobbett et al. | 324/433 |
| 4,459,548 | A | | 7/1984 | Lentz et al. | 324/158 |
| 4,514,694 | A | | 4/1985 | Finger | 324/429 |
| 4,520,353 | A | | 5/1985 | McAuliffe | 340/636 |
| 4,564,798 | A | | 1/1986 | Young | 320/6 |
| 4,633,418 | A | | 12/1986 | Bishop | 364/554 |
| 4,659,977 | A | | 4/1987 | Kissel et al. | 320/64 |
| 4,663,580 | A | | 5/1987 | Wortman | 320/35 |
| 4,665,370 | A | | 5/1987 | Holland | 324/429 |
| 4,667,143 | A | | 5/1987 | Cooper et al. | 320/22 |
| 4,667,279 | A | | 5/1987 | Maier | 363/46 |
| 4,678,998 | A | | 7/1987 | Muramatsu | 324/427 |
| 4,679,000 | A | | 7/1987 | Clark | 324/428 |
| 4,680,528 | A | | 7/1987 | Mikami et al. | 320/32 |
| 4,686,442 | A | | 8/1987 | Radomski | 320/17 |
| 4,697,134 | A | | 9/1987 | Burkum et al. | 320/48 |
| 4,707,795 | A | | 11/1987 | Alber et al. | 364/550 |
| 4,709,202 | A | | 11/1987 | Koenck et al. | 320/43 |
| 4,710,861 | A | | 12/1987 | Kanner | 363/46 |
| 4,719,428 | A | | 1/1988 | Liebermann | 324/436 |
| 4,743,855 | A | | 5/1988 | Randin et al. | 324/430 |
| 4,745,349 | A | | 5/1988 | Palanisamy et al. | 320/22 |
| 4,816,768 | A | | 3/1989 | Champlin | 324/428 |
| 4,820,966 | A | | 4/1989 | Fridman | 320/32 |
| 4,825,170 | A | | 4/1989 | Champlin | 324/436 |
| 4,847,547 | A | | 7/1989 | Eng, Jr. et al. | 320/35 |
| 4,849,700 | A | | 7/1989 | Morioka et al. | 324/427 |
| 4,876,495 | A | | 10/1989 | Palanisamy et al. | 320/18 |
| 4,881,038 | A | | 11/1989 | Champlin | 324/426 |
| 4,888,716 | A | | 12/1989 | Ueno | 364/550 |
| 4,912,416 | A | | 3/1990 | Champlin | 324/430 |
| 4,913,116 | A | | 4/1990 | Katogi et al. | 123/425 |
| 4,929,931 | A | | 5/1990 | McCuen | 340/636 |
| 4,931,738 | A | | 6/1990 | MacIntyre et al. | 324/435 |
| 4,937,528 | A | | 6/1990 | Palanisamy | 324/430 |
| 4,947,124 | A | | 8/1990 | Hauser | 324/430 |
| 4,956,597 | A | | 9/1990 | Heavey et al. | 320/14 |
| 4,968,941 | A | | 11/1990 | Rogers | 324/428 |
| 4,968,942 | A | | 11/1990 | Palanisamy | 324/430 |
| 5,004,979 | A | | 4/1991 | Marino et al. | 324/160 |
| 5,032,825 | A | | 7/1991 | Xuznicki | 340/636 |
| 5,037,778 | A | | 8/1991 | Stark et al. | 437/216 |
| 5,047,722 | A | | 9/1991 | Wurst et al. | 324/430 |
| 5,087,881 | A | | 2/1992 | Peacock | 324/378 |
| 5,095,223 | A | | 3/1992 | Thomas | 307/110 |
| 5,126,675 | A | | 6/1992 | Yang | 324/435 |
| 5,140,269 | A | | 8/1992 | Champlin | 324/433 |
| 5,144,218 | A | | 9/1992 | Bosscha | 320/44 |
| 5,144,248 | A | | 9/1992 | Alexandres et al. | 324/428 |
| 5,160,881 | A | | 11/1992 | Schramm et al. | 322/7 |
| 5,170,124 | A | | 12/1992 | Blair et al. | 324/434 |
| 5,179,335 | A | | 1/1993 | Nor | 320/21 |
| 5,194,799 | A | * | 3/1993 | Tomantschger | 320/103 |
| 5,204,611 | A | | 4/1993 | Nor et al. | 320/21 |
| 5,214,370 | A | | 5/1993 | Harm et al. | 320/35 |
| 5,214,385 | A | | 5/1993 | Gabriel et al. | 324/434 |
| 5,241,275 | A | | 8/1993 | Fang | 324/430 |
| 5,254,952 | A | | 10/1993 | Salley et al. | 324/429 |
| 5,266,880 | A | | 11/1993 | Newland | 320/14 |
| 5,281,919 | A | | 1/1994 | Palanisamy | 324/427 |
| 5,281,920 | A | | 1/1994 | Wurst | 324/430 |
| 5,295,078 | A | | 3/1994 | Stich et al. | 364/483 |
| 5,298,797 | A | | 3/1994 | Redl | 307/246 |
| 5,300,874 | A | | 4/1994 | Shimamoto et al. | 320/15 |
| 5,302,902 | A | | 4/1994 | Groehl | 324/434 |
| 5,315,287 | A | | 5/1994 | Sol | 340/455 |
| 5,321,626 | A | | 6/1994 | Palladino | 364/483 |
| 5,331,268 | A | | 7/1994 | Patino et al. | 320/20 |
| 5,336,993 | A | | 8/1994 | Thomas et al. | 324/158.1 |
| 5,338,515 | A | | 8/1994 | Dalla Betta et al. | 422/95 |
| 5,339,018 | A | | 8/1994 | Brokaw | 320/35 |
| 5,343,380 | A | | 8/1994 | Champlin | 363/46 |
| 5,347,163 | A | | 9/1994 | Yoshimura | 307/66 |
| 5,352,968 | A | | 10/1994 | Reni et al. | 320/35 |
| 5,365,160 | A | | 11/1994 | Leppo et al. | 320/22 |
| 5,365,453 | A | | 11/1994 | Startup et al. | 364/481 |
| 5,381,096 | A | | 1/1995 | Hirzel | 324/427 |
| 5,412,323 | A | | 5/1995 | Kato et al. | 324/429 |
| 5,426,371 | A | | 6/1995 | Salley et al. | 324/429 |
| 5,426,416 | A | | 6/1995 | Jefferies et al. | 340/664 |
| 5,432,426 | A | | 7/1995 | Yoshida | 320/20 |
| 5,434,495 | A | | 7/1995 | Toko | 320/44 |
| 5,435,185 | A | | 7/1995 | Eagan | 73/587 |
| 5,442,274 | A | | 8/1995 | Tamai | 320/23 |
| 5,445,026 | A | | 8/1995 | Eagan | 73/591 |
| 5,449,996 | A | | 9/1995 | Matsumoto et al. | 320/20 |
| 5,449,997 | A | | 9/1995 | Gilmore et al. | 320/39 |
| 5,451,881 | A | | 9/1995 | Finger | 324/433 |

| | | | | |
|---|---|---|---|---|
| 5,457,377 A | | 10/1995 | Jonsson | 320/5 |
| 5,469,043 A | | 11/1995 | Cherng et al. | 320/31 |
| 5,485,090 A | | 1/1996 | Stephens | 324/433 |
| 5,488,300 A | | 1/1996 | Jamieson | 324/432 |
| 5,519,383 A | | 5/1996 | De La Rosa | 340/636 |
| 5,528,148 A | | 6/1996 | Rogers | 324/426 |
| 5,537,967 A | | 7/1996 | Tashiro et al. | 123/792.1 |
| 5,546,317 A | | 8/1996 | Andrieu | 364/481 |
| 5,548,273 A | | 8/1996 | Nicol et al. | 340/439 |
| 5,550,485 A | | 8/1996 | Falk | 324/772 |
| 5,561,380 A | | 10/1996 | Sway-Tin et al. | 324/509 |
| 5,562,501 A | | 10/1996 | Kinoshita et al. | 439/852 |
| 5,563,496 A | | 10/1996 | McClure | 320/48 |
| 5,572,136 A | | 11/1996 | Champlin | 324/426 |
| 5,574,355 A | | 11/1996 | McShane et al. | 320/39 |
| 5,583,416 A | | 12/1996 | Klang | 320/22 |
| 5,585,728 A | | 12/1996 | Champlin | 324/427 |
| 5,589,757 A | | 12/1996 | Klang | 320/22 |
| 5,592,093 A | | 1/1997 | Klingbiel | 324/426 |
| 5,596,260 A | | 1/1997 | Moravec et al. | 320/30 |
| 5,598,098 A | | 1/1997 | Champlin | 324/430 |
| 5,602,462 A | | 2/1997 | Stich et al. | 323/258 |
| 5,606,242 A | | 2/1997 | Hull et al. | 320/48 |
| 5,621,298 A | | 4/1997 | Harvey | 320/5 |
| 5,633,985 A | | 5/1997 | Severson et al. | 395/2.76 |
| 5,637,978 A | * | 6/1997 | Kellett et al. | 320/104 |
| 5,642,031 A | | 6/1997 | Brotto | 320/21 |
| 5,650,937 A | | 7/1997 | Bounaga | 364/483 |
| 5,652,501 A | | 7/1997 | McClure et al. | 320/17 |
| 5,653,659 A | | 8/1997 | Kunibe et al. | 477/111 |
| 5,656,920 A | | 8/1997 | Cherng et al. | 320/31 |
| 5,675,234 A | | 10/1997 | Greene | 320/15 |
| 5,677,077 A | | 10/1997 | Faulk | 429/90 |
| 5,699,050 A | | 12/1997 | Kanazawa | 340/636 |
| 5,701,089 A | | 12/1997 | Perkins | 327/772 |
| 5,705,929 A | | 1/1998 | Caravello et al. | 324/430 |
| 5,710,503 A | | 1/1998 | Sideris et al. | 320/6 |
| 5,711,648 A | | 1/1998 | Hammerslag | 414/786 |
| 5,717,336 A | | 2/1998 | Basell et al. | 324/430 |
| 5,717,937 A | | 2/1998 | Fritz | 395/750.01 |
| 5,739,667 A | | 4/1998 | Matsuda et al. | 320/5 |
| 5,747,909 A | | 5/1998 | Syverson et al. | 310/156 |
| 5,754,417 A | | 5/1998 | Nicollini | 363/60 |
| 5,757,192 A | | 5/1998 | McShane et al. | 324/427 |
| 5,760,587 A | | 6/1998 | Harvey | 324/434 |
| 5,773,978 A | | 6/1998 | Becker | 324/430 |
| 5,789,899 A | | 8/1998 | van Phuoc et al. | 320/30 |
| 5,793,359 A | | 8/1998 | Ushikubo | 345/169 |
| 5,796,239 A | | 8/1998 | van Phuoc et al. | 320/107 |
| 5,808,469 A | | 9/1998 | Kopera | 324/43.4 |
| 5,818,234 A | | 10/1998 | McKinnon | 324/433 |
| 5,821,756 A | | 10/1998 | McShane et al. | 324/430 |
| 5,825,174 A | | 10/1998 | Parker | 324/106 |
| 5,831,435 A | | 11/1998 | Troy | 324/426 |
| 5,850,113 A | * | 12/1998 | Weimer et al. | 307/125 |
| 5,862,515 A | | 1/1999 | Kobayashi et al. | 702/63 |
| 5,872,443 A | | 2/1999 | Williamson | 320/21 |
| 5,895,440 A | | 4/1999 | Proctor et al. | 702/63 |
| 5,914,605 A | | 6/1999 | Bertness | 324/430 |
| 5,927,938 A | | 7/1999 | Hammerslag | 414/809 |
| 5,929,609 A | | 7/1999 | Joy et al. | 322/25 |
| 5,939,855 A | | 8/1999 | Proctor et al. | 320/104 |
| 5,939,861 A | | 8/1999 | Joko et al. | |
| 5,945,829 A | | 8/1999 | Bertness | 324/430 |
| 5,951,229 A | | 9/1999 | Hammerslag | 414/398 |
| 5,961,561 A | | 10/1999 | Wakefield, II | 701/29 |
| 5,961,604 A | | 10/1999 | Anderson et al. | 709/229 |
| 5,969,625 A | | 10/1999 | Russo | 340/636 |
| 5,982,156 A | * | 11/1999 | Weimer et al. | 323/222 |
| 6,002,235 A | * | 12/1999 | Clore | 320/105 |
| 6,002,238 A | | 12/1999 | Champlin | 320/134 |
| 6,008,652 A | | 12/1999 | Theofanopoulos et al. | 324/434 |
| 6,009,369 A | | 12/1999 | Boisvert et al. | 701/99 |
| 6,031,354 A | | 2/2000 | Wiley et al. | 320/116 |
| 6,037,751 A | | 3/2000 | Klang | 320/160 |
| 6,037,777 A | | 3/2000 | Champlin | 324/430 |
| 6,051,976 A | | 4/2000 | Bertness | 324/426 |
| 6,061,638 A | | 5/2000 | Joyce | 702/63 |
| 6,072,299 A | | 6/2000 | Kurie et al. | 320/112 |
| 6,072,300 A | | 6/2000 | Tsuji | 320/116 |
| 6,081,098 A | | 6/2000 | Bertness et al. | 320/134 |
| 6,091,245 A | | 7/2000 | Bertness | 324/426 |
| 6,094,033 A | | 7/2000 | Ding et al. | 320/132 |
| 6,104,167 A | | 8/2000 | Bertness et al. | 320/132 |
| 6,114,834 A | | 9/2000 | Parise | 320/109 |
| 6,137,269 A | | 10/2000 | Champlin | 320/150 |
| 6,140,797 A | | 10/2000 | Dunn | 320/105 |
| 6,144,185 A | | 11/2000 | Dougherty et al. | 320/132 |
| 6,150,793 A | | 11/2000 | Lesesky et al. | 320/104 |
| 6,161,640 A | | 12/2000 | Yamaguchi | 180/65.8 |
| 6,163,156 A | | 12/2000 | Bertness | 324/426 |
| 6,172,483 B1 | | 1/2001 | Champlin | 320/134 |
| 6,172,505 B1 | | 1/2001 | Bertness | 324/430 |
| 6,181,545 B1 | | 1/2001 | Amatucci et al. | 361/502 |
| 6,222,342 B1 | * | 4/2001 | Eggert et al. | 320/105 |
| 6,222,369 B1 | | 4/2001 | Champlin | 324/430 |
| 6,225,808 B1 | | 5/2001 | Varghese et al. | 324/426 |
| 6,236,332 B1 | | 5/2001 | Conkright et al. | 340/825.06 |
| 6,242,887 B1 | * | 6/2001 | Burke | 320/104 |
| 6,249,124 B1 | | 6/2001 | Bertness | 324/426 |
| 6,250,973 B1 | | 6/2001 | Lowery et al. | 439/763 |
| 6,254,438 B1 | | 7/2001 | Gaunt | 439/755 |
| 6,259,254 B1 | | 7/2001 | Klang | 324/427 |
| 6,262,563 B1 | | 7/2001 | Champlin | 320/134 |
| 6,294,896 B1 | | 9/2001 | Champlin | 320/134 |
| 6,294,897 B1 | | 9/2001 | Champlin | 320/153 |
| 6,304,087 B1 | | 10/2001 | Bertness | 324/426 |
| 6,307,349 B1 | | 10/2001 | Koenck et al. | 320/112 |
| 6,310,481 B1 | | 10/2001 | Bertness | 324/430 |
| 6,313,607 B1 | | 11/2001 | Champlin | 320/132 |
| 6,313,608 B1 | | 11/2001 | Varghese et al. | 32/132 |
| 6,316,914 B1 | | 11/2001 | Bertness | 320/134 |
| 6,323,650 B1 | | 11/2001 | Bertness et al. | 324/426 |
| 6,329,793 B1 | | 12/2001 | Bertness et al. | 320/132 |
| 6,331,762 B1 | | 12/2001 | Bertness | 320/134 |
| 6,332,113 B1 | | 12/2001 | Bertness | 702/63 |
| 6,346,795 B1 | | 2/2002 | Haraguchi et al. | 320/136 |
| 6,347,958 B1 | | 2/2002 | Tsai | 439/488 |
| 6,351,102 B1 | | 2/2002 | Troy | 320/139 |
| 6,359,441 B1 | | 3/2002 | Bertness | 324/426 |
| 6,359,442 B1 | | 3/2002 | Henningson et al. | 324/426 |
| 6,363,303 B1 | | 3/2002 | Bertness | 701/29 |
| 6,384,608 B1 | | 5/2002 | Namaky | 324/425 |
| 6,388,448 B1 | | 5/2002 | Cervas | 324/426 |
| 6,392,414 B1 | | 5/2002 | Bertness | 324/429 |
| 6,411,098 B1 | | 6/2002 | Laletin | 324/436 |
| 6,417,669 B1 | | 7/2002 | Champlin | 324/426 |
| 6,424,158 B1 | | 7/2002 | Klang | 324/433 |
| 6,441,585 B1 | | 8/2002 | Bertness | 320/132 |
| 6,445,158 B1 | | 9/2002 | Bertness et al. | 320/104 |
| 6,456,045 B1 | | 9/2002 | Troy et al. | 320/139 |
| 6,466,025 B1 | | 10/2002 | Klang | 324/429 |
| 6,466,026 B1 | | 10/2002 | Champlin | 324/430 |
| 6,495,990 B1 | | 12/2002 | Champlin | 320/132 |
| 6,679,212 B1 | * | 1/2004 | Kelling | 123/179.28 |

FOREIGN PATENT DOCUMENTS

| | | |
|---|---|---|
| EP | 0 772 056 A1 | 5/1997 |
| FR | 2 749 397 | 12/1997 |
| GB | 2 088 159 A | 6/1982 |
| JP | 59-17892 | 1/1984 |
| JP | 59-17893 | 1/1984 |

| | | |
|---|---|---|
| JP | 59-17894 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04131779 | 5/1992 |
| JP | 04372536 | 12/1992 |
| JP | 5216550 | 8/1993 |
| JP | 7-128414 | 5/1995 |
| JP | 09061505 | 3/1997 |
| JP | 10056744 | 2/1998 |
| RU | 2089015 C1 | 8/1997 |
| WO | WO 93/22666 | 11/1993 |
| WO | WO 94/05069 | 3/1994 |
| WO | WO 98/58270 | 12/1998 |
| WO | WO 99/23738 | 5/1999 |
| WO | WO 00/67359 | 11/2000 |
| WO | WO 01/51947 | 7/2001 |

OTHER PUBLICATIONS

"Field and Laboratory Studies to Assess the State of Health of Valve–Regulated Lead Acid Batteries: Part I Conductance/Capacity Correlation Studies", by D. Feder et al., *IEEE*, Aug. 1992, pp. 218–233.

"JIS Japanese Industrial Standard–Lead Acid Batteries for Automobiles", *Japanese Standards Association UDC*, 621.355.2:629–113.006, Nov. 1995.

"Performance of Dry Cells," by C. Hambuechen, Preprint of *Am. Electrochem. Soc.*, Apr. 18–20, 1912, paper No. 19, pp. 1–5.

"A Bridge for Measuring Storage Battery Resistance", by E. Willihncanz, *The Electrochemical Society*, preprint 79–20, Apr. 1941, pp. 253–258.

National Semiconductor Corporation, "High Q Notch Filter", 3/69, Linear Brief 5, Mar. 1969.

Burr–Brown Corporation, "Design a 60 Hz Notch Filter with the UAF42", 1/94, AB–071, 1994.

National Semiconductor Corporation, "LMF90–4$^{th}$–Order Elliptic Notch Filter", 12/94, RRD–B30M115, Dec. 1994.

"Alligator Clips with Wire Penetrators" *J.S. Popper, Inc.* product information, downloaded from http://www.jspopper.com/, undated.

"#12: LM78S40 Simple Switcher DC to DC Converter", *ITM e–Catalog*, downloaded from http://www.pcbcafe.com, undated.

"Simple DC–DC Converts Allows Use of Single Battery", *Electronix Express*, downloaded from http://www.elexp.com/t_dc–dc.htm, undated.

"DC–DC Converter Basics", *Power Designers*, downloaded from http://www.poweDErdesigners.com/InforWeb.design_center/articles/DC–DC/converter.shtm, undated.

"Notification of Transmittal of the International Search Report or the Declaration", PCT/US02/29461.

* cited by examiner

BOOSTER PACK WITH STORAGE CAPACITOR

CROSS REFERENCE TO RELATED APPLICATION

This application claims priority of U.S. Provisional Application No. 60/300,386, filed Jun. 22, 2001 and entitled "BATTERY CHARGER WITH BOOSTER PACK".

BACKGROUND OF THE INVENTION

The present invention relates to rechargeable storage batteries. More specifically, the present invention relates to a jump-start booster pack with storage capacitors for use with such storage batteries.

Rechargeable storage batteries, such as lead acid storage batteries are employed in automobiles. These rechargeable vehicle batteries provide cranking power to start the vehicle and are also the only source of power to continue to maintain the lights or other devices in operation when the vehicle ignition has been turned off. Circumstances may occur that cause the vehicle battery charge to deplete so that the battery is incapable of starting the vehicle. Such conditions normally arise due to the fact that the operator of the vehicle has inadvertently left the lights, radio, or other energy consuming device or accessory running in the vehicle after the vehicle ignition has been turned off. Such a depleted or "dead" battery is incapable of providing the necessary cranking power to start the vehicle. Frequently, a jump-start booster pack is used to provide cranking energy to start the vehicle under these conditions. A jump-start booster pack typically includes an internal booster battery of about the same terminal voltage as the vehicle battery. Such a booster battery usually has a relatively high capacity and provides substantially all of the cranking power necessary to start a vehicle with a depleted battery. However, since the cranking operation continues for a very short period of time (a few seconds), employing such a relatively high capacity booster battery in the jump-start booster pack results in an unnecessary increase in cost and complexity of the booster pack.

SUMMARY OF THE INVENTION

A jump-start booster pack for starting a vehicle having a depleted vehicle battery is provided. The jump-start booster pack includes a positive connector that can couple to a positive terminal of the vehicle battery and a negative connector that can couple to a negative terminal of the vehicle battery. The apparatus also includes a storage capacitor that provides starting energy to the vehicle when electrical connection is made between the storage capacitor and the vehicle battery through the positive and negative connectors.

BRIEF DESCRIPTION OF THE DRAWINGS

FIG. 2-1 is a simplified block diagram showing a jump-start booster pack including a DC-DC converter circuit in accordance with an embodiment of the present invention.

FIG. 2-2 illustrates a DC-DC converter circuit that is useful with the present invention.

FIGS. 3-1 and 3-2 illustrate embodiments of an apparatus for providing energy to a vehicle battery.

DETAILED DESCRIPTION OF THE PREFERRED EMBODIMENTS

Figure 1:
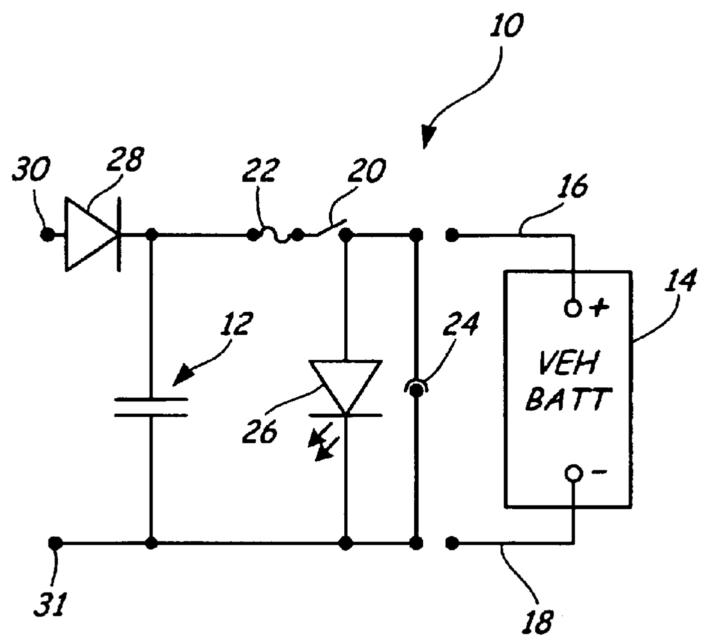
FIG. 1 is a simplified block diagram showing a jump-start booster pack in accordance with an embodiment of the present invention.

FIG. 1 is a simplified block diagram showing a jump-start booster pack 10 in accordance with an embodiment of the present invention. Jump-start booster pack 10 includes a storage capacitor 12 that can provide starting energy to a vehicle when connected in parallel to the vehicle battery 14 to be boosted. Capacitor 12 may be a single storage capacitor or may constitute multiple series connected storage capacitors. As can be seen in FIG.1, positive and negative connectors or cables 16 and 18 are schematically indicated, and are provided to connect storage capacitor 12 to terminals of vehicle battery 14. A switch 20 is provided in series with cable 16 (only one switch connected to either cable 16 or 18 is required) so as to provide a connection between storage capacitor 12 and vehicle battery 14, after the cables 16 and 18 have been put in place. A fuse 22 is provided in series with the switch 20. Alternatively, fuse 22 and switch 20 could be provided as a single entity, such as a circuit breaker switch. There is also provided protection against inadvertent wrong polarity connections being made.

In a preferred embodiment of the present invention, storage capacitor 12 is a supercapacitor, which has properties that are a combination of some of the energy storage capabilities of batteries with some of the power discharge characteristics of conventional capacitors. U.S. Pat. No. 6,181,545, entitled SUPERCAPACITOR STRUCTURE describes one type of supercapacitor. The supercapacitor device described in U.S. Pat. No. 6,181,545 has low internal resistance and is capable of yielding high energy and high current density over considerable time periods and may be conveniently fabricated by lamination of electrode and separator films prepared from polymeric compositions comprising activated carbon and ion-conductive electrolyte. In general, a supercapacitor can hold a very high charge which can be released relatively quickly, thereby making it very suitable for jump starting a vehicle, since the vehicle cranking operation lasts for a very short period of time during which high cranking power is required. In addition, supercapacitors that are relatively small in size can be employed in jump-start booster packs to provide sufficient cranking power to jump-start a vehicle. Thus, in one aspect of the present invention, a portable jump-start booster pack 32 with an internal supercapacitor 12 is provided.

In embodiments of the present invention, jump-start booster pack 22 includes a handle (not shown) and is transportable on wheels (not shown). Internal capacitor 12 may be a conventional capacitor or a supercapacitor in such transportable embodiments of jump-start booster pack 22.

A lamp 26, such as a LED, may be provided across the terminals of storage capacitor 12 at a position on a side of switch 20 which is remote from storage capacitor 12. Therefore, when storage capacitor 12 is connected to vehicle battery 14, and the switch 20 is closed, lamp 26 will be illuminated. Lamp 26 may be Zener operated in such a manner that it will only illuminate when it is connected across the voltage of the storage capacitor 12, but not across a substantially depleted terminal voltage of the vehicle battery 14.

In some embodiments of the present invention, internal storage capacitor 12 may be charged by vehicle battery 14 or a vehicle alternator system (not shown) by electrically coupling to input nodes 30 and 31 of jump-start booster pack 10. A diode 28, may be included to prevent backflow of energy from internal storage capacitor 12 when it is being charged. Connecting storage capacitor 12 to the vehicle battery 14 may simply involve plugging wires which are also permanently connected to storage capacitor 12 and to a cigarette lighter plug into a cigarette lighter socket.

In some embodiments of the present invention, apparatus 10 can function as a portable power pack. In such embodiments, a connection or socket means, shown schematically at 24, which is essentially identical to a cigarette lighter socket may be connected across storage capacitor 12. Battery or low voltage operated devices such as emergency lamps, search lamps, a vacuum cleaner, etc., may be powered for a short term from the storage capacitor 12 by being connected from their own plug to the cigarette lighter socket arrangement 24.

To operate jump-start booster pack 10 to provide sufficient starting energy to vehicle battery 14, the appropriate connections are made as discussed above. In actuality, a pair of cables may be provided having clamps at one end of each cable to be connected to the terminals of the vehicle battery 14; and having a polarized plug at the other end of each cable for connection to a provided socket in jump-start booster pack 10. Then, after the cables are connected to the vehicle battery 14 and to the socket connection for the booster pack 10, the switch 20 is then closed and energy will flow from the storage capacitor 12 to the vehicle battery 14. After connection of storage capacitor 12 to the vehicle battery 14, the voltage of the parallel connected capacitor and battery rises to a level which is necessary to initiate and sustain spark ignition during cranking.

Figures 1, 2:
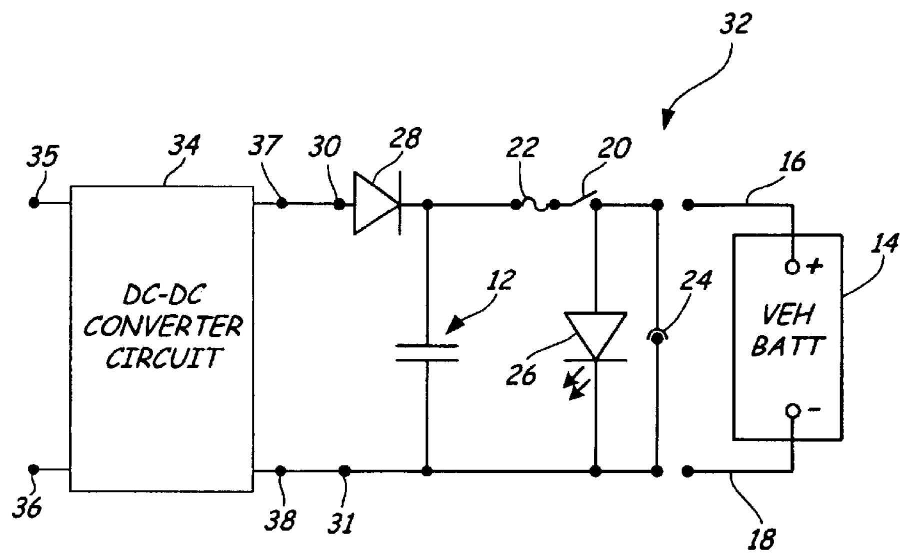
Figure 2:
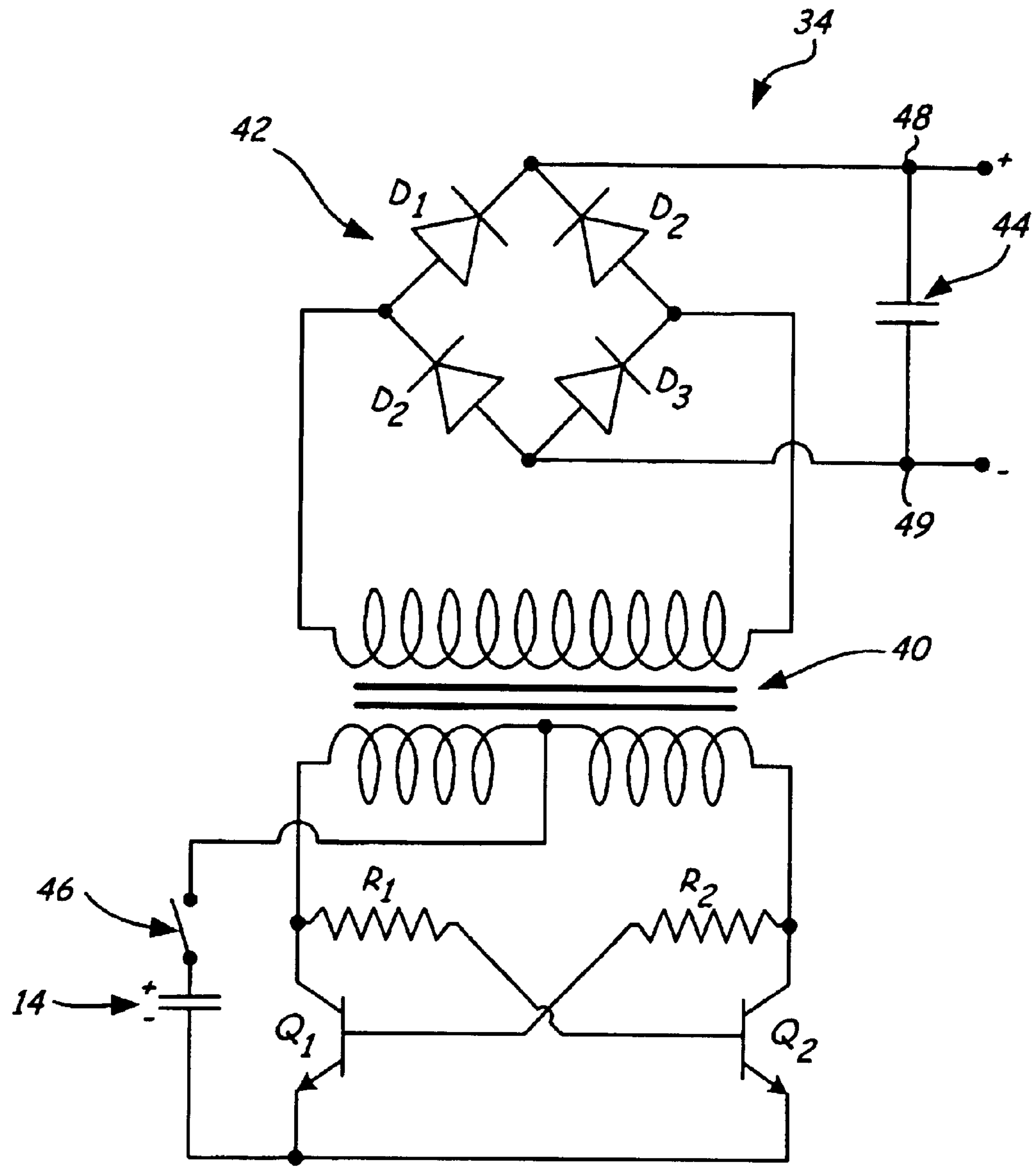

FIG. 2-1 is a simplified block diagram showing a jump-start booster pack 32 in accordance with an embodiment of the present invention. The same reference numerals are used to represent the same or similar elements of booster pack 10 (FIG. 1) and 32 (FIG. 2-1). Booster pack 32 includes a DC-DC converter circuit 34 that can provide a multiplied output voltage across nodes 37 and 38 as a function of an input or supply voltage provided across nodes 35 and 36. DC-DC converter circuit 34 may be any charge pump or multiplier circuit known in the art. Such charge pump circuits typically include multiple charge storage devices, such as capacitors, that can be charged individually by a supply voltage and form a series connected chain to provide a multiplied voltage output. As can be seen in FIG. 2-1, the output nodes 37 and 38 of DC-DC converter circuit 34 are connected to nodes 30 and 31 to provide charging energy to capacitor 12. The remaining elements of booster pack 32 (FIG. 2-1) are similar to the elements of booster pack 10 (FIG. 1). A significant advantage of employing DC-DC converter circuit 34 in booster pack 32 is that even the depleted vehicle battery 14, having a relatively low output voltage, can be used to charge capacitor 12, via DC-DC converter circuit 34, to a voltage level sufficient to provide cranking energy to start the vehicle.

FIG. 2-2 illustrates a DC-DC converter circuit 34 which is used with the present invention. DC-DC converter circuit 34 includes two transistors Q1 and Q2, two resistors R1 and R2, a transformer 40, a bridge rectifier 42 including four diodes D1, D2, D3 and D4 and a capacitor 44. A DC voltage source, such as depleted vehicle battery 14, which provides an input voltage or supply voltage, is coupled to the primary side of transformer 40. An output voltage or changing voltage having a magnitude greater than the magnitude of the supply voltage is obtained across capacitor 44 on the secondary side of transformer 40.

In operation, when switch 46 is closed, power is applied to transistors Q1 and Q2. Transistors Q1 and Q2 drive the transformer primary with the base drive for each transistor coming from the collector of the other transistor. When power is applied, suppose transistor Q1 turns on a few nanoseconds faster than transistor Q2, then the collector voltage of transistor Q1 drops, shutting off transistor Q2, and collector voltage of transistor Q2 rises causing a greater collector current to flow through transistor Q1. The collector voltage of transistor Q1 drops further due to the inductive reactance of the primary coil of transformer 40.

As current flows through the primary winding of transformer 40, a voltage is induced in the transformer secondary winding by the expanding the magnetic field in the transformer core. At a certain point, the magnetic field stops expanding, because either the transistor Q1 has reached the maximum collector current it can pass, or because the transformer core has reached the maximum magnetic field it can hold. In either case, the inductive reactance of the transformer primary drops, causing the voltage on the collector of transistor Q1 to rise. Since the collector of transistor Q1 drives the base of Q2, Q2 turns on, which in turn shuts off transistor Q1. Now current flows in the opposite direction through the primary, causing the magnetic field in the core to reverse itself, which induces an opposite voltage in the secondary which continues until the field stops expanding and the process switches again. Bridge rectifier 42 ensures that the voltage across capacitor 44 always has the same polarity (positive at node 48 and negative at node 49). As mentioned above, transformer 40 is configured to provide a secondary voltage that is greater than the primary voltage. Thus, circuit 34 boosts the supply voltage provided at its input. The boosted voltage across capacitor 44 is the changing voltage applied to storage capacitor 12 (FIG. 1).

Figures 1, 3:
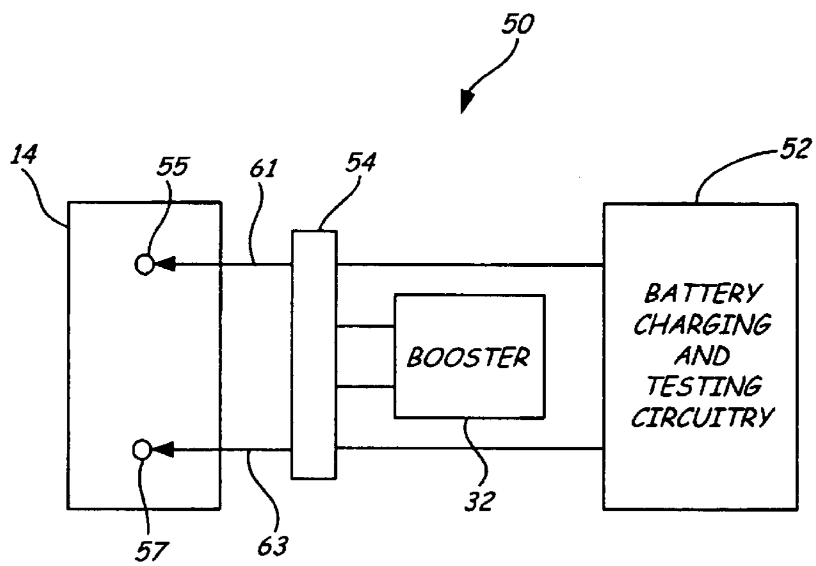
Figures 2, 3:
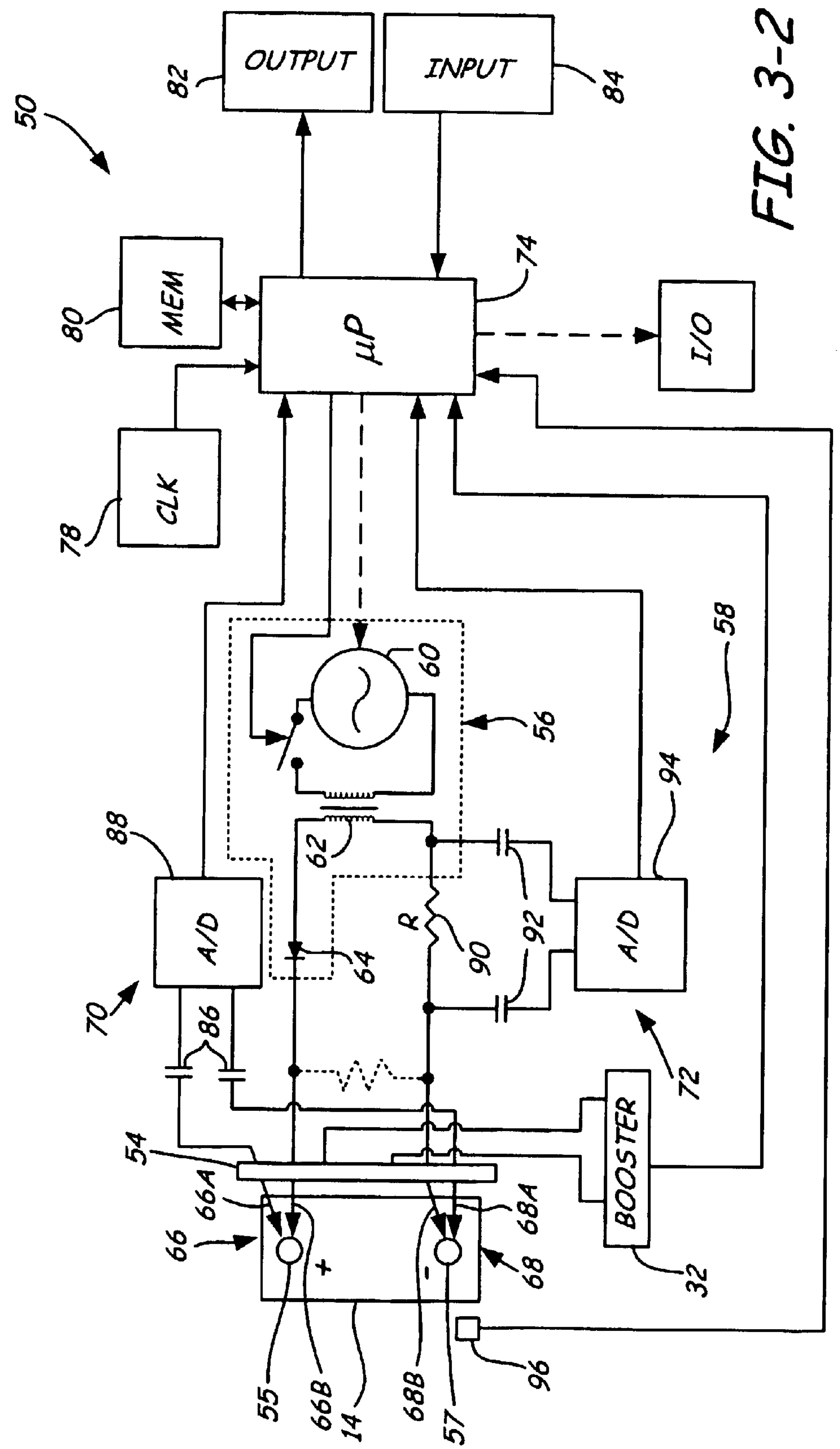

FIG. 3-1 is a very simplified block diagram of a jump-start booster pack with integrated battery charging and testing circuitry in accordance with an embodiment of the present invention. System 50 is shown coupled to a vehicle battery 14. System 50 includes battery charging and testing circuitry 52, jump-start booster pack 32, described above in connection with FIG. 2-1, and mode selection switch 54. System 50 couples to battery contacts 55 and 57 through electrical connections 61 and 63, respectively. Details and components of a battery charging and testing circuitry 52 are provided in the description of FIG. 3-2 below. Mode selection switch 54 can be set in different positions, with each position corresponding to a different mode in which system 50 operates. For example, system 50 can be set to operate in modes such as “charge vehicle battery”, “charge storage capacitor”, “charge vehicle battery and storage capacitor”, “jump-start vehicle battery”, “test vehicle battery”, etc.

FIG. 3-2 is a simplified block diagram of an embodiment of system 50 showing components of charging and testing circuitry 52. System 50 is shown coupled to vehicle battery 14. System 50 includes battery charger circuitry 56, battery test circuitry 58 and a jump-start booster pack 32. Battery charge circuitry 56 generally includes AC source 60, transformer 62 and rectifier 64. System 50 couples to vehicle battery 14 through electrical connection 66 which couples to the positive battery contact 55 and electrical connection 68 which couples to the negative battery contact 57. Mode selection switch 54 can be set in the different positions mentioned above in connection with FIG. 3-1. In one preferred embodiment, a four point (or Kelvin) connection technique is used in which battery charge circuitry 56 couples to battery 14 through electrical connections 66A and 68A while battery testing circuitry 58 couples to vehicle battery 14 through electrical connections 66B and 68B.

Battery testing circuitry 58 includes voltage measurement circuitry 70 and current measurement circuitry 72 which provide outputs to microprocessor 74. Microprocessor 74 also couples to a system clock 78 and memory 80 which is used to store information and programming instructions. In the embodiment of the invention shown in FIG. 3-2, microprocessor 74 also couples to booster pack 32, user output circuitry 82 and user input circuitry 84.

Voltage measurement circuitry 70 includes capacitors 86 which couple analog to digital converter 88 to vehicle battery 14 thorough electrical connections 86B and 88B. Any type of coupling mechanism may be used for element 86 and capacitors are merely shown as one preferred embodiment. Further, the device may also couple to DC signals. Current measurement circuitry 82 includes a shunt resistor (R) 90 and coupling capacitors 92. Shunt resistor 90 is coupled in series with battery charging circuitry 56. Other current measurement techniques are within the scope of the invention including Hall-Effect sensors, magnetic or inductive coupling, etc. An analog to digital converter 94 is connected across shunt resistor 90 by capacitors 92 such that the voltage provided to analog to digital converter 94 is proportional to a current I flowing through vehicle battery 14 due to charging circuitry 96. Analog to digital converter 94 provides a digitized output representative of this current to microprocessor 94.

During operation in vehicle battery charging mode, AC source 60 is coupled to vehicle battery 14 through transformer 62 and rectifier 64. Rectifier 64 provides half wave rectification such that current I has a non-zero DC value. Of course, full wave rectification or other AC sources may also be used. Analog to digital converter 94 provides a digitized output to microprocessor 74 which is representative of current I flowing through vehicle battery 14. Similarly, analog to digital converter 88 provides a digitized output representative of the voltage across the positive and negative terminals of vehicle battery 14. Analog to digital converters 88 and 94 are capacitively coupled to vehicle battery 14 such that they measure the AC components of the charging signal.

Microprocessor 74 determines the conductance of vehicle battery 14 based upon the digitized current and voltage information provided by analog to digital converters 94 and 88, respectively. Microprocessor 74 calculates the conductance of vehicle battery 14 as follows:

$$\text{Conductance} = G = \frac{I}{V} \qquad \text{Eq. 1}$$

where I is the AC charging current and V is the AC charging voltage across vehicle battery 14. The battery conductance is used to monitor charging of vehicle battery 14. It has been discovered that as a battery is charged the conductance of the battery rises which can be used as feedback to the charger. This rise in conductance can be monitored in microprocessor 74 to determine when the battery has been fully charged. Conductance can be correlated to a condition of vehicle battery 14 which can be used as a basis for comparison of the battery against a battery rating, such as the Cold Cranking Amp (CCA) rating of the battery. A temperature sensor 76 can be thermally coupled to battery 14 and used to compensate battery measurements. Temperature readings can be stored in memory 80 for later retrieval.

In accordance with the present invention, the internal storage capacitor 12 of booster pack 32 can also be charged by circuitry 52. In embodiments of the present invention, vehicle battery 14 can also be charged by storage capacitor 12. Results of tests performed on vehicle battery 14 may be displayed on a suitable device (not shown) that can couple to microprocessor 74.

Although the present invention has been described with reference to preferred embodiments, workers skilled in the art will recognize that changes may be made in form and detail without departing from the spirit and scope of the invention. It should be understood that the term "vehicle" not only includes cars and trucks, but can be equally applied to such installations as motors for boats, motorcycles, snowmobiles, farm tractors, etc. Vehicle battery 14 may be a 6-cell battery (12.6V), a 12-cell battery (25.2V), an 18-cell battery (42V), a 24-cell battery (50.4V), etc. In aspects of the present invention, capacitor 12 may be charged to different voltage levels. Thus, booster pack 32, that includes capacitor 12, may be utilized to jump-start vehicles including storage batteries with different rated voltages. For example, capacitor 12 may be charged to a first voltage level for use with a vehicle having a 6-cell battery, and charged to a second voltage level for use with a vehicle having an 18-cell battery. In addition, capacitor 12 may also be charged from batteries having different rated voltages. Further, with the help of DC-DC converter circuit 34, capacitor 12 may be charged to a particular voltage level from a 6-cell battery, a 12-cell battery, etc. Thus, a significant advantage of booster pack 32 with internal capacitor 12 is that it can be utilized for such "cross-voltage" applications.

What is claimed is:

1. An apparatus for starting a vehicle having a depleted vehicle battery, the apparatus comprising:
- a portable jump-start booster pack, separate from the vehicle, comprising:
  - a positive connector configured to couple to a positive terminal of the vehicle battery;
  - a negative connector configured to couple to a negative terminal of the vehicle battery;
  - a storage capacitor configured to provide starting energy to the vehicle when electrical connection is made between the storage capacitor and the vehicle battery through the positive and negative connectors; and
  - a DC-DC converter circuit configured to receive a supply voltage, from a source that is independent of the apparatus for starting the vehicle, and to provide a charging voltage, as a function of the supply voltage, to charge the storage capacitor, wherein the charging voltage is greater than the supply voltage.

2. The apparatus of claim 1 wherein the storage capacitor is a supercapacitor.

3. The apparatus of claim 1 wherein charging energy is provided to the storage capacitor from the vehicle battery.

4. The apparatus of claim 1 wherein charging energy is provided to the storage capacitor from an alternator of the vehicle.

5. The apparatus of claim 1 wherein the DC-DC converter circuit comprises a transformer configured to step up the supply voltage.

6. The apparatus of claim 5 wherein the DC-DC converter further comprises a bridge rectifier circuit configured to provide rectification of the stepped up supply voltage provided by the transformer.

7. The apparatus of claim 1 wherein the DC-DC converter circuit includes a transistor.

8. The apparatus of claim 1 wherein the DC-DC converter circuit includes a charge storage device.

9. The apparatus of claim 8 wherein the charge storage device is a capacitor.

10. The apparatus of claim 1 wherein the input supply voltage is provided by the depleted vehicle battery.

11. The apparatus of claim 1 wherein the jump-start booster pack further comprises battery charging circuitry configured to charge the vehicle battery.

12. The apparatus of claim 11 wherein the battery charging circuitry is further configured to charge the storage capacitor.

13. The apparatus of claim 11 wherein the battery charging circuitry is coupled to the vehicle battery through a four point Kelvin connection.

14. The apparatus of claim 1 wherein he jump-start booster pack further comprises battery testing circuitry configured to test the vehicle battery.

15. The apparatus of claim 14 wherein the battery testing circuitry is coupled to the vehicle battery through a four point Kelvin connection.

16. A method of jump-starting a vehicle having a depleted vehicle battery, the method comprising:

providing a portable jump-start booster pack, separate from the vehicle, the jump-start boaster pack comprising:

a positive connector configured to couple to a positive terminal of the vehicle battery;

a negative connector configured to couple to a negative terminal of the vehicle battery;

a storage capacitor configured to provide starting energy to the vehicle when electrical connection is made between the storage capacitor and the vehicle battery through the positive and negative connectors; and a DC-DC converter circuit configured to receive a supply voltage, from a source that is independent of the apparatus for starting the vehicle, and to provide a charging voltage, as a function of the supply voltage, to charge the storage capacitor, wherein the charging voltage is greater than the supply voltage.

17. The method of claim 16 wherein the storage capacitor is a supercapacitor.

18. The method of claim 16 further comprising charging the storage capacitor from the vehicle battery.

19. The method of claim 16 further comprising charging the storage capacitor from an alternator of the vehicle.

20. The method of claim 16 wherein the DC-DC converter circuit comprises a transformer configured to step up the supply voltage.

21. The method of claim 20 wherein the DC-DC converter further comprises a bridge rectifier circuit configured to provide rectification of the stepped up supply voltage provided by the transformer.

22. The method of claim 16 wherein the DC-DC converter circuit includes a transistor.

23. The method of claim 16 wherein the DC-DC converter circuit includes a charge storage device.

24. The method of claim 23 wherein the charge storage device is a capacitor.

25. The method of claim 16 wherein the supply voltage is provided by the depleted vehicle battery.

26. The method of claim 16 wherein the jump-start booster pack further comprises battery charging circuitry configured to charge the vehicle battery.

27. The method of claim 26 wherein the battery charging circuitry is further configured to charge the storage capacitor.

28. The method of claim 26 further comprising coupling the battery charging circuitry to the vehicle battery through a four point Kelvin connection.

29. The method of claim 16 wherein the jump-start booster pack further comprises battery testing circuitry configured to test the vehicle battery.

30. The method of claim 29 further comprising coupling the battery testing circuitry to the vehicle battery through a four point Kelvin connection.

* * * * *